United States Patent [19]
Ortiz, Jr.

[11] Patent Number: 5,065,448
[45] Date of Patent: Nov. 12, 1991

[54] OPTICAL FIBER QUICK CONNECT/DISCONNECT HAVING ELECTRONIC FEEDBACK

[75] Inventor: Angel L. Ortiz, Jr., Scotia, N.Y.

[73] Assignee: General Electric Company, Schenectady, N.Y.

[21] Appl. No.: 674,253

[22] Filed: Mar. 25, 1991

[51] Int. Cl.$^5$ .......................... G02B 6/00; G02B 6/36
[52] U.S. Cl. ...................... 385/53; 385/55; 385/70
[58] Field of Search ..... 350/96.10, 96.15, 96.20–96.22

[56] References Cited

U.S. PATENT DOCUMENTS

| | | | |
|---|---|---|---|
| 4,295,043 | 10/1981 | Eibner et al. | 350/96.20 |
| 4,407,562 | 10/1983 | Young | 350/96.20 |
| 4,531,810 | 7/1985 | Carlsen | 350/96.20 |
| 4,707,073 | 11/1987 | Kocher | 350/96.23 |
| 4,718,744 | 1/1988 | Manning | 350/96.20 |
| 4,732,450 | 3/1988 | Lee | 350/96.18 |
| 4,753,521 | 6/1988 | Deserno | 350/465 |
| 4,779,948 | 10/1988 | Wais et al. | 350/96.20 |
| 4,868,361 | 9/1989 | Chande et al. | 219/121.62 |
| 4,915,466 | 4/1990 | Sorensen et al. | 350/96.20 |
| 4,958,900 | 9/1990 | Ortiz, Jr. | 350/96.18 |

Primary Examiner—Akm Ullah
Attorney, Agent, or Firm—James R. McDaniel; James C. Davis, Jr.; Paul R. Webb, II

[57] ABSTRACT

This invention discloses an optical fiber connect/disconnect for power lasers. The connect/disconnect should allow a laser/fiber user to quickly interface fiber injection input and fiber output couples while providing electrical feedback and optical alignment. The connect/disconnect also offers an electrical feedback which should provide the user with operating parameters of the input and output couplers and/or the connect/disconnect assembly.

7 Claims, 4 Drawing Sheets

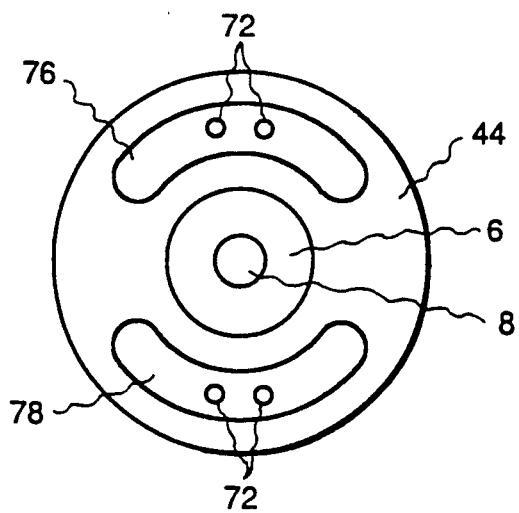
FIG. 3
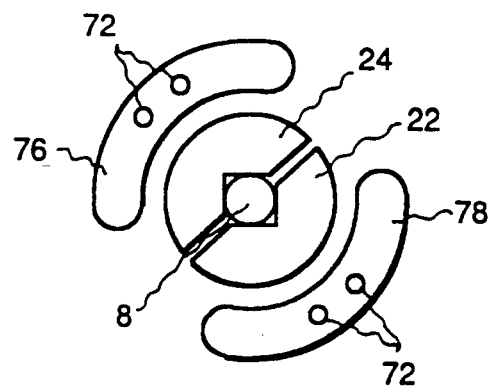
FIG. 4
FIG. 5a
FIG. 5b
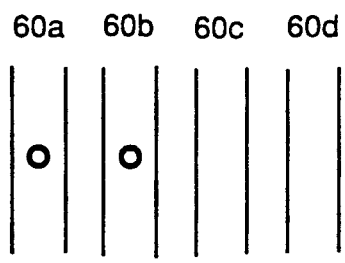
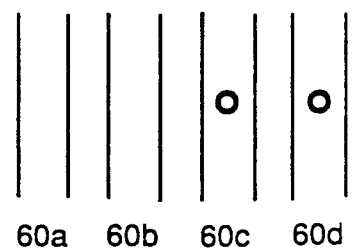

OPTICAL FIBER QUICK CONNECT/DISCONNECT HAVING ELECTRONIC FEEDBACK

CROSS REFERENCES TO RELATED APPLICATIONS

This invention is related to U.S. Patent Application Ser. Nos. 07/660,068 and 07/666,976, respectively entitled "Optical Fiber Quick Connect/Disconnect For a Power Laser" and "Optical Fiber Quick Connect/Disconnect Having Electrical Contacts", which applications are assigned to the same assignee as the present application now pending.

BACKGROUND OF THE INVENTION

1. Field of the Invention

This invention relates to high power laser systems of the type which, typically, operate at over 500 watts and up to several hundreds of Joules that have optical fiber assemblies which are constructed with electrical feedback in order to form a quick connection/disconnection. Such structures of the type, as described more completely in the following description of the invention, generally allow a quick electrical interface between fiber injection input and fiber output couplers that provides electrical feedback to the operator. In particular, an electrical feedback contact is secured to a quick connect/disconnect main body at one end and the main body is inserted into a quick connect/disconnect main body receiver such that the electrical feedback contact mates with another electrical feedback contact in receiver. The receiver, typically, is connected to a fiber input or output coupler. This invention, particularly, relates to certain unique optical fiber and electrical feedback connections for a power laser and the connection/disconnection means in association therewith.

2. Description of the Related Art

Prior to the present invention, as set forth in general terms above and more specifically below, it was known, in lower power communication systems and high power laser transmission systems, to make use of optical fiber holders and, alternatively, optical fiber holders having microswitch interlock assemblies. Exemplary of the low power communication type fiber holders are U.S. Pat. Nos. 4,513,810; 4,753,521; and 4,718,744, respectively entitled "Optical Fiber Holders", "Lens System for Focusing a Divergent Laser Beam", and "Collimating Lens and Holder For An Optical Fiber" which disclose fiber holders that, typically, require potting or adhering of the optical fiber into ceramic, metallic or plastic ferrules. While these systems adequately hold the optical fiber, these systems, typically, do not allow for high power laser beam injection nor do they quickly disconnect without mechanically loosening the fastening devices, usually set screws. Also, the "potting" of the fiber does not efficiently lend itself to field repair, in that the fiber becomes permanently bonded to the holder and cannot be readily removed from the holder if the fiber is damaged. Finally, the fiber optic connectors developed for low power applications usually cannot be employed in high power applications because the higher power laser can adversely affect and severely damage the mechanical means of the low power fiber connector due to burning.

Also, high power laser transmission fiber systems, as exemplified in U.S. Pat. Nos. 4,707,073 and 4,732,450, typically, do not quickly disconnect without mechanically loosening the fastening devices, usually, set screws, and, also, require the fiber to be "potted" in place. Other high power fiber holders such as U.S. Pat. Nos. 4,744,627, 4,868,361, and 4,958,900 respectively entitled "Optical Fiber Holder", Coupling Device For High Power Laser Transmitting Optical Fibers", and "Multi-Fiber Holder For Output Coupler and Methods Using Same" and all assigned to the same company, namely the General Electric Company, as the present invention, describe fiber holders using a groove however do not describe or teach quick connectors/disconnectors. For example, if the fiber is potted in place and an inadvertent torsional stress is placed on the holder, this stress may be transferred to the fiber and may adversely affect the mechanical and optical transmission characteristics of the fiber.

Exemplary of the microswitch type fiber holders are U.S. patent application Ser. No. 07/660,068 entitled "Optical Fiber Quick Connect/Disconnect for a Power Laser" which discloses a fiber holder that, preferably, employs a switch assembly which is located within a receiver. The switch assembly, preferably, is a conventional microswitch interlock assembly. In particular, when the housing is inserted into the receiver, the end of the housing should contact the switch assembly and engage the switch. When the housing engages the switch assembly, a signal is sent from the switch assembly to an operator control panel which indicates that the housing and the receiver are properly connected. Conversely, when the housing and the receiver are disconnected, the switch assembly should send a signal which indicates such a condition. The switch assembly also prevents the operator from removing the housing during high power laser transmission because the switch is electrically connected to the operator panel and the laser interlock so that the switch automatically cuts off the high power laser transmission when the housing is removed from the receiver. However, while the switch cuts off the laser transmission when the housing is removed from the receiver, the switch does not provide a fail/safe switch which would prevent inadvertent laser transmission or an electrical feedback from the coupler which is attached to the receiver back to the coupler which is attached to the housing. Consequently, a more advantageous optical fiber connect/disconnect system, then, would be presented if such fail/safe switch and an electrical feedback could be added.

Exemplary of an improved fiber optic quick connect/disconnect is U.S. patent application Ser. No. 07/666,976 entitled "Fiber Optic Quick Connect/Disconnect with Electrical Contacts" which discloses the use of fail/safe switch for the laser interlock but does not teach electrical feedback which is required for obtaining fiber input and output coupler operating status. Therefore, it would be still more advantageous if such an electrical feedback could be added.

It is apparent from the above that there exists a need in the art for a high power laser optical fiber connect/disconnect system which will quickly and easily allow connection/disconnection between the input and output couplers, and which at least equals the transmission characteristics of known fiber holding systems, but which at the same time provides electrical feedback to the operator regarding the operating status of the input and/or output couplers. It is a purpose of this invention to fulfill this and other needs in the art in a manner more apparent to the skilled artisan, once given the following disclosure.

SUMMARY OF THE INVENTION

Generally speaking, this invention fulfills these needs by providing an optical fiber connect/disconnect for a power laser which is comprised of a main body means having a first electrical feedback means secured to said main body means and adapted to releasably secure an optical fiber means, a main body receiver means having a second electrical feedback means; a coupler means secured to said receiver means, and said main body means releasably engaging said receiver means in order to create an electrical feedback circuit between said first and second feedback and a fiber optical path through said body means, said receiver means and said coupler means.

In certain preferred embodiments, the first electrical feedback is a flexible circuit board secured to the main body and having feedback wires connected at one end to the board and at the other end to a control panel. Also, the second electrical contact means are spring loaded contacts.

In another further preferred embodiment, the main body and the main body receiver can be quickly and easily connected/disconnected such that the electrical feedbacks complete an electrical circuit which allows the user to determine through a feedback device the operating status of the fiber input and output couplers and the connect/disconnect mechanism.

In particularly preferred embodiments, the optical fiber connect/disconnect system of this invention consists essentially of an optical fiber releasingly connected at one end to a main body having an electrical feedback on the other end which has feedback wires connected at one end to a control panel and the other end to a flexible circuit board which encircles the outer diameter of the other end of the main body and a main body receiver having another electrical contact which is located on the inner diameter of the receiver and is electrically connected to a coupler attached to the receiver such that when the main body is inserted into the receiver and releasably engages the receiver, an optical fiber connection and an electrical feedback circuit between the control panel, the couplers, and the connect/disconnect mechanism is formed. A precise optical alignment between the optical fiber input or output coupler is also established.

The preferred optical fiber disconnect/connect, according to this invention, offers the following advantages: ease of disconnection and connection; good stability; good durability; good field repairability characteristics; good optical alignment between input and/or output coupler; excellent connection/disconnection assurance; good economy; high strength for safety; and an electrical feedback means. In fact, in many of the preferred embodiments, the factor of connection/disconnection assurance and electrical feedback are optimized to an extent considerably higher than heretofore achieved in prior, known fiber connectors.

BRIEF DESCRIPTION OF THE DRAWINGS

The above and other features of the present invention which will become more apparent as the description proceeds are best understood by considering the following detailed description in conjunction with the accompanying drawings wherein like numbers represent like parts throughout the several views and in which:

FIG. 3 is a front view taken along line 3-3 in FIG. 1;

FIG. 4 is a front view taken along line 4-4 in FIG. 1

FIG. 5a and 5b are detailed drawings of the upper and lower dashed areas, respectively in FIG. 1.

DETAILED DESCRIPTION OF THE INVENTION

Figure 1:
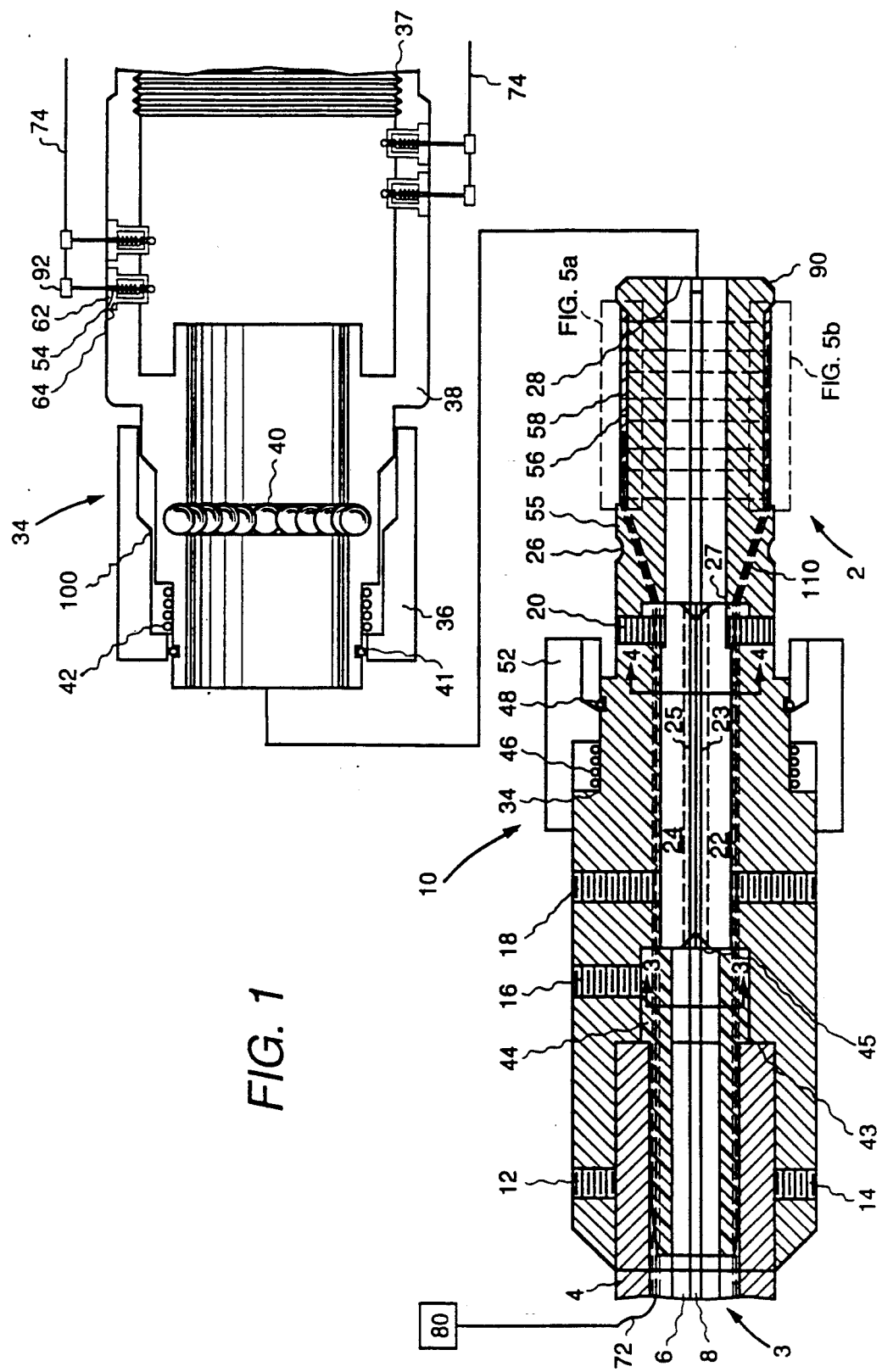
FIG. 1 is a side plan view of an optical fiber quick connect/disconnect with the component parts disconnected, according to the present invention.
Figure 2:
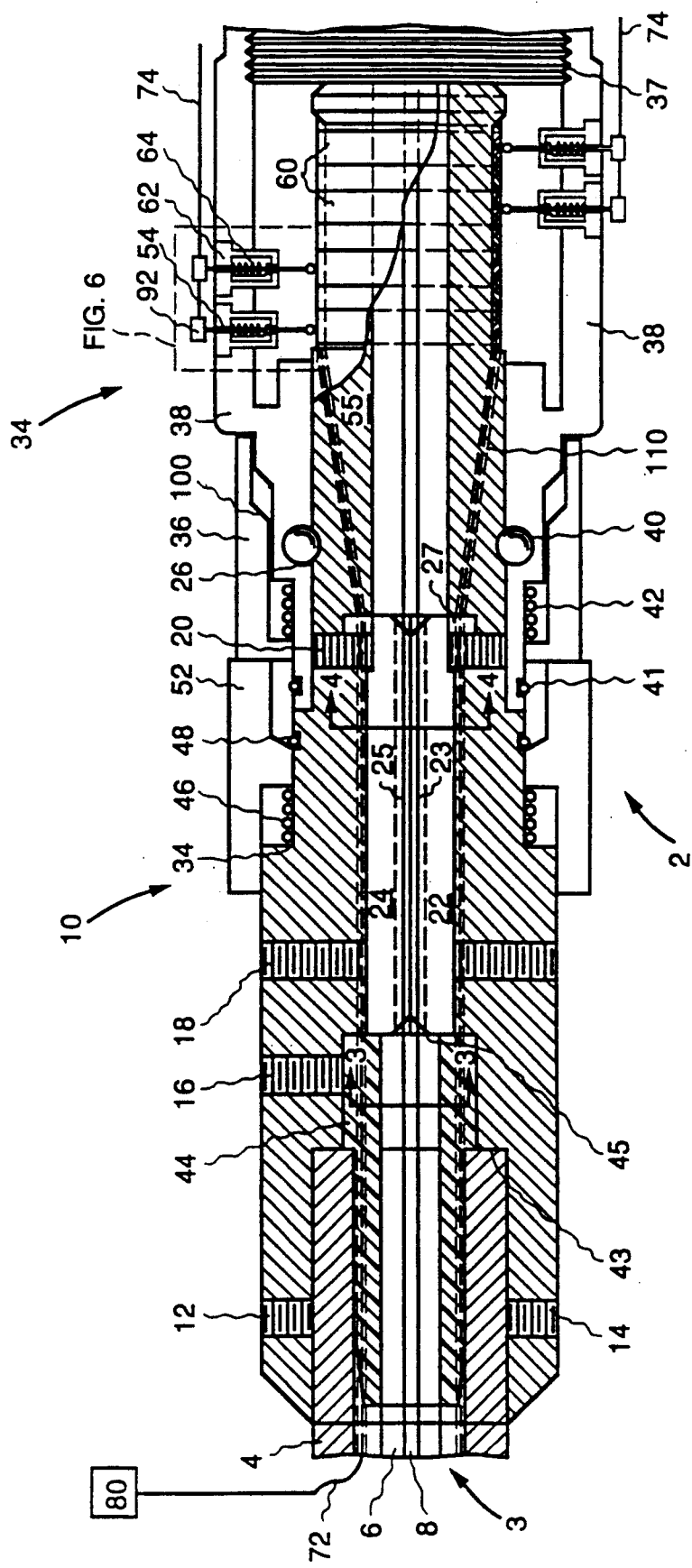
FIG. 2 is a side plan view of an optical fiber connect/disconnect main body with the components parts connected, according to the present invention.

With reference first to FIGS. 1 and 2, optical fiber quick connect/disconnect assembly 2 is shown. Assembly 2, except for contact 54, extension 55, notch 56, circuit board 58, contact 60, support 62, and spring 64, wires 72,74, slots 76,78, control panel and laser interlock 80, and wire guides 110 are disclosed in related U.S. patent application Ser. No. 07/660,068. As discussed earlier, the present invention is an improvement over the optical fiber quick connect/disconnect as set forth in U.S. patent application Ser. No. 07/660,068, and U.S. patent application Ser. No. 07/666,976 in that the present invention employs an electrical feedback circuit which should inform the user of the operating status of the couplers and assembly 2.

As disclosed in U.S. patent application Ser. No. 07/660,068, one end of an optical fiber assembly 3 is placed inside of housing 10. Housing 10, preferably, is constructed of non-magnetic stainless steel. Optical fiber assembly 3, preferably, is constructed of ¼ inch Sealtite ® armor cable 4 which is manufactured by Anaconda. Tubing 6, preferably, constructed of ⅛ Polyflo ® tubing and manufactured by Imperial Eastman is placed inside of cable 4. Fiber 8, preferably, a polymer or glass-clad fiber, manufactured under the tradename Anhydraguide ® fiber by Fiberguide Industries, is located within tubing 6.

Cable 4 terminates at notch 43 in housing 10. Cable 4 and sections of tubing 6 and fiber 8 are rigidly secured in housing 10 by fasteners 12,14. Fasteners 12,14, preferably, are conventional, steel set screws having a hex socket head. Preferably, there are three fasteners 12 set approximately 120 degrees apart. Likewise, three fasteners 14 are set approximately 120 degrees apart.

Tubing 6 terminates at end 45 of clamp 44 in housing 10 (FIG. 2). Clamp 44, preferably, is constructed of nylon. Clamp 44, the remaining section of tubing 6 and a section of fiber 8 are rigidly secured in housing 10 by fasteners 16. Fasteners 16, preferably numbering three, are conventional steel set screws having a hex socket head and are set approximately 120 degrees apart. However, it is to be understood that due to the very close tolerances between clamp 44 and cable 4, fasteners 16 may not be needed.

Another further section of fiber 8 is rigidly secured in fiber holders 22,24. Fiber holders 22,24, are constructed of fused silica and are machined by conventional machining techniques to create longitudinal grooves 23,25 whereby fiber 8 is located and retained. The machining tolerances between the fiber diameter, fiber holders and housing are such that when assembled, the fiber is gently squeezed such that there are no effects to the fiber transmission characteristics. Fiber holders 22,24 and fiber 8 are rigidly secured in housing 10 by threaded fasteners 18,20. Threaded fasteners 18,20, preferably, are conventional soft tip, steel set screws having a hex socket head. The end of fiber holders 22,24 abut against notch 27 in housing 10.

The remaining length of fiber 8 is located, preferably, about ⅞" beyond fiber holders 22,24 and within housing 10. Preferably, the end of fiber 8 should be located several millimeters inside of hole 28 in housing 10. Fiber 8 is located away from hole 28 and inside housing 10 in order to protect fiber 8 from dust and to keep the end of fiber 8 from being mechanically damaged.

Located on the outside of housing 10 is knob 52, spring 46 and spring clip 48. Knob 52, preferably, is knurled by conventional techniques and is constructed of non-magnetic, stainless steel. Spring 46 and spring clip 48, preferably, are constructed of spring steel. Spring 46 biases on knob 52, preferably, in order to maintain pressure on receiver knob 36, thus, preventing inadvertent release between housing 10 and receiver 34 and also to keep ball bearings 40 locked into groove 26. Spring clip 48 is a conventional biasing spring for keeping knob 52 in engagement with housing 10.

Located on extension 55 of housing 10 is a 45° chamfer 90. Chamfer 90 is machined on extension 55 by conventional techniques. Also, located on extension 55 is notch 56. Notch 56 is machined into extension 55 by conventional machining techniques. Notch 56, preferably, is ¼ inch (wide)× at least twice the thickness of board 58 (deep). Also located in extension 55 are wire guides 110. Wire guides 110, preferably, are made in extension 55 by conventional machining techniques, such as, plunge electro-discharge machining. Wires 72 are run through wire guides 110 such that wires 72 can be electrically connected to contacts 60 in circuit board 58. (FIGS. 5a and 5b). A conventional flexible circuit board 58 is wrapped around and rigidly attached to notch 56 by conventional adhesive techniques. Board 58 contains contacts 60a–60d, preferably, constructed of copper which are electrically connected by conventional electrical contacts, for example, solder joints to wires 72 and, which, when mated with feedback contacts 54 and wires 74 create an electrical feedback circuit between operator panel and laser interlock 80 and assembly 2.

With respect to the invention as set forth in U.S. patent application Ser. No. 07/660,068, housing receiver 34, preferably, is constructed of non-magnetic, stainless steel. End cap 36, preferably, knurled on its outer periphery by conventional machining techniques, and constructed of non-magnetic stainless steel is secured to receiver 34 by conventional spring clip fastener 41. End cap 36, is biased by a conventional spring 42 so that as end cap 36 is moved towards casing 38, and spring 42 is compressed. Ball bearings 40 are allowed to move inward allowing receiver 34 to engage housing 10. Once housing 10 is fully engaged, ball bearings 40 engage groove 26 thus locking ball bearings 40 into groove 26 thereby, securing housing 10 to receiver 34. It is to be understood that while ball bearing are disclosed, other biasing devices such as wedges can also be used. The criteria for such biasing means being that they must "snap" into and mate with groove 26 and adequately retain housing 10 in locking engagement with receiver 34. The tolerances between housing 10 and receiver main body provide, preferably, less than or equal to 0.0005 inches thereby allowing optical alignment between optical fiber and input/output couplers when assembling. Likewise, housing 10 may rotate about its centerline axis and removes torsional stresses between the housing 10 and receiver 34, while maintaining optical alignment between optical fiber assembly 3 and input/output coupler means. Located along one end of casing 38 are threads 37 in which an input or output coupler (not shown) can be threadedly attached.

FIG. 3 depicts slots 76,78 which are formed in clamp 44 by conventional techniques, such as drilling. Wires 72 which are connected at one end to a conventional feedback control panel and laser interlock 80 are run along slots 76,78 in clamp 44 to slots 76,78 in housing 10 (FIG. 4). Wires 72 are electrically connected at the other end by conventional electrical connects to board 58 (FIGS. 5a and 5b).

With respect to FIGS. 5a, wires 72 are electrically connected to contacts 60a and 60b which are located to the left-hand portion of board 58 while FIG. 5b shows two more wires 72 being electrically connected to contacts 60c and 60d located on the right-hand portion of board 58. In this manner, when housing 10 is connected to receiver 34 and feedback contacts 54 engage feedback contacts 60a–60d, different operating parameters of the coupler attached to receiver 34 can be sent through wires 74 to contacts 54 to contacts 60a–60d to wires 72 and, ultimately, back to control panel and laser interlock 80. For example, one wire 74 may be electrically connected to a temperature sensor (not shown) in the fiber input or output coupler attached to receiver 34, while another wire 74 may be electrically connected to a laser power sensor (not shown) in the fiber input or output coupler. Another wire 74 may be electrically connected to a photodetector sensor (not shown) in the fiber input or output coupler, while still another wire 74 may be electrically connected to a laser interlock (not shown) in the fiber input or output coupler. Once housing 10 is connected to receiver 34 and contacts 54 and 60a–60d interface to create an electrical feedback circuit, the operator should be able to view operator panel and laser interlock 80 to determine if the coupler attached to receiver 34 is operating correctly and if assembly 2 is operating correctly. In this way, the wires, which are normally run along the outside of assembly 2 from operator panel and laser interlock 80 to the input or output couplers, and which may create a logistical and electrical burden, may be neatly placed inside of assembly 2 where they are out of the way of the operator.

Likewise, wires 72 can be used for transmitting sensor information from an output coupler such as disclosed in commonly assigned U.S. Pat. No. 4,673,795 entitled "Integrated Robotic Laser Material Processing and Imaging System" back to the operator console and laser interlock 80.

Figure 6:
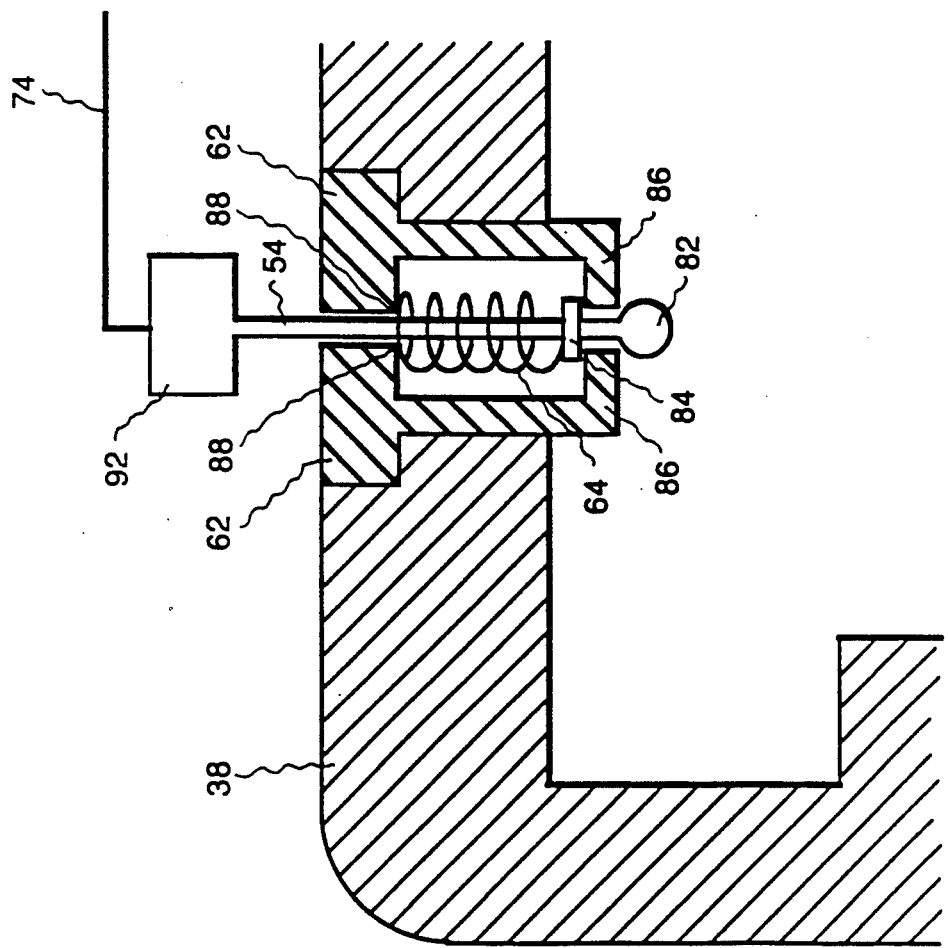
FIG. 6 is a detailed drawing of the dashed area in FIG. 2.

Also, with respect to FIG. 6 of the invention embodied in the present application, electrical pin 54 is also located within receiver 34. Electrical pin 54 having ball 82, preferably, is constructed of non-magnetic stainless steel. Pin 54 is connected to solder lug 92 then by a conventional electrical connection to operator console and laser interlock 80. Electrical pin 54 is retained inside holder 62. Holder 62, preferably, is constructed of polyethylene or nylon which provides electrical isolation between casing 38 and electrical pin 54. Spring 64 is also retained inside holder 62 by shoulder 84 and retainers 86,88. Spring 64, preferably, is constructed of spring steel. Spring 64 biases electrical pin 54 so that electrical pin 54 electrically connects to board 58. Holder 62 is rigidly secured to receiver 34 by conventional fasteners (not shown). It is to be understood that while only two electrical pins 54 are depicted, the number of electrical pins 54 can vary depending upon the number of contacts 60 on board 58 and the number and type of electrical circuits employed.

In operation, as housing 10 is inserted into receiver 34, knob 52 contacts end cap 36. As extension 55 is moved further inside receiver 34, the contact between knob 52 and end cap 36, causes end cap 36 to move towards threads 37 in receiver 34. As end cap 36 moves towards threads 37, chamfer 100 of end cap 36 contacts ball bearings 40 to push ball bearings 40 inwardly and spring 42 is compressed. Once housing 10 is completely seated in receiver 34 (FIG. 2), ball bearings 40 "snap" into groove 26, and knob 52 forces end cap 36 to contact casing 38. Contacts 54 engage contacts 60a–60d which create a feedback circuit. End cap 36 is retained in place as shown in FIG. 2 by the force of spring 46 in knob 52. Because end cap 36 is retained in this position, ball bearings 40 are retained in groove 26 which should maintain the locking engagement of housing 10 in receiver 34.

Housing 10 is disengaged from receiver 34 merely by pushing end cap 36 away from casing 38 which should release ball bearings 40 from groove 26. After ball bearings 40 are released, ball bearings 40 disengagement from groove 26 is allowed and, housing 10 can be readily removed from receiver 34. The disengagement of housing 10 from receiver 34 breaks the feedback circuit.

Once given the above disclosure, many other features, modifications and improvements will become apparent to the skilled artisan. Such features, modifications and improvements are, therefore, considered to be a part of this invention, the scope of which is to be determined by the following claims.

What is claimed is:

1. An optical fiber connect/disconnect for a power laser which is comprised of:
   a main body means;
   a first electrical feedback means secured to said main body means and said main body means being adapted to releasably secure an optical fiber means;
   a main body receiver means;
   a second electrical feedback means secured to said main body receiver means;
   a coupler means secured to said receiver means; and
   said main body means releasably engaging said receiver means in order to create an electrical feedback circuit between said first and second feedbacks and to create a fiber optical path through said main body means, said receiver means and said coupler means.

2. The optical fiber connect/disconnect for a power laser, according to claim 1, wherein an optical fiber means is releasably secured to said main body means, said optical fiber means comprised of:
   an extension; and
   a notch located substantially along a circumference of said extension.

3. The optical fiber connect/disconnect for a power laser, according to claim 1, wherein said first electrical feedback means is further comprised of:
   a flexible circuit board.

4. The optical fiber connect/disconnect for a power laser, according to claim 1, wherein said second electrical feedback means is further comprised of:
   a holder means rigidly attached to said receiver means;
   a contact means substantially located within said holder means;
   a spring substantially located within said holder means for biasing said switch means against said first electrical feedback means; and
   a electrical connection means between said switch means and said coupler means.

5. The optical fiber connect/disconnect for a power laser, according to claim 1, wherein said main body means is further comprised of:
   an aperture means;
   a slot means adjacent to said aperture means; and
   wire means traversing said aperture means and said slot means.

6. An optical fiber connect/disconnect for a power laser which is comprised of:
   a main body means having an extension and a notch located substantially along a circumference of said extension;
   a first electrical feedback means secured to said main body means and said main body means being adapted to releasably secure an optical fiber means;
   a main body receiver means;
   a second electrical feedback means secured to said main body receiver means;
   a coupler means secured to said receiver means; and
   said main body means releasably engaging said receiver means in order to create an electrical feedback circuit between said first and second feedbacks and to create a fiber optical path through said main body means, said receiver means and said coupler means.

7. A method for connecting an optical fiber means for a power laser to a coupler means with said optical fiber means having an end, a main body means including a first electrical feedback and a groove located on said main body means such that said main body means is releasably securable to said end of said fiber means, and a main body receiver means including a second electrical feedback, spring means and a coupler means which is comprised of the steps of:
   inserting said main body means into said main body receiver means;
   loosening said spring means in said main body receiver means;
   substantially simultaneously engaging said spring means in said groove and contacting said first electrical feedback of said main body means with said second electrical feedback in said receiver means to create an electrical circuit and a releasably engageable connection between said optical fiber means and said coupler means and allow rotation between said main body means and said receiver means about their respective longitudinal axes while substantially maintaining optical alignment between said optical fiber and said coupler means and maintaining an electrical feedback circuit continuity during said rotation.

* * * * *